Feb. 6, 1968  M. OSTERRIETH ET AL  3,367,998
POLYETHYLENE BASE COMPOSITIONS
CONTAINING POLYTERPENE RESINS
Filed Aug. 12, 1964
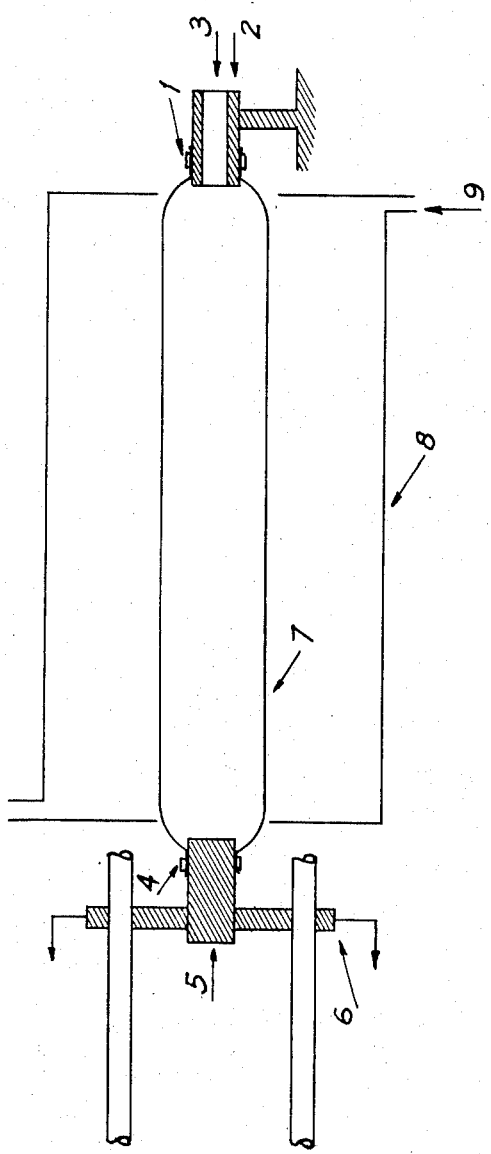
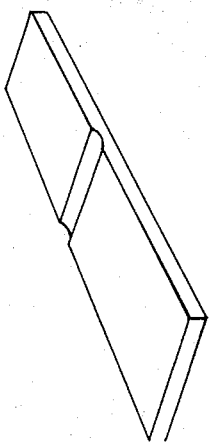
Inventor
MICHEL OSTERRIETH
FRANZ COCQUYT
By Toulmin & Toulmin
Attorneys

United States Patent Office 3,367,998
Patented Feb. 6, 1968

3,367,998
POLYETHYLENE BASE COMPOSITIONS
CONTAINING POLYTERPENE RESINS
Michel Osterrieth, Brussels, and Franz Cocquyt, Schaerbeek, Brussels, Belgium, assignors to Solvay & Cie, Brussels, Belgium
Filed Aug. 12, 1964, Ser. No. 389,159
Claims priority, application France, Oct. 11, 1963, 950,290, Patent 1,378,310
6 Claims. (Cl. 260—897)

ABSTRACT OF THE DISCLOSURE

The suitability of high density polyethylene for fabrication into film is improved by mixing with the polyethylene a polyterpene resin having a fusion point no higher than 55° C.

---

The present invention pertains to polyethylene base compositions containing polyterpene resins. More particularly, it pertains to polyethylene base compositions of high density and high molecular weight containing polyterpene resins.

The compositions of the present invention are suitable for the manufacture of transparent films, biaxially drawn films, filaments and fashioned objects such as flasks and similar receivers, boxes with covers and valises.

High density polyethylene, which is especially suitable for the manufacture of various types of objects, is little used for the manufacture of films. In fact, films manufactured by blown extrusion from this polyethylene, are highly opaline. Films extruded by means of a draw plate and which have simultaneously undergone a rapid cooling and a stretching, are transparent, but their mechanical properties are mediocre and their resistance to shock in particular and to tearing in the direction of the drawing, is poor.

Attempts have been made in the past to remedy these defects and polyethylene films of high density and high molecular weight which have been drawn biaxially do not possess these defects. However, the biaxial drawing of the films is only possible in a narrow range of temperatures above 100° C. Even when the speed of drawing exceeds a certain limit only slightly or the temperature of the film at the moment of its drawing is slightly lowered, the orientation is accompanied by a very marked opacification.

Different means have been proposed for improving the transparency of the films, filaments, and objects made from polyethylene but none of them has been entirely satisfactory. The different improvements proposed, when they increase the transparency, harm other important properties of the polyethylene, and in particular the mechanical properties. In addition, the high molecular weight polyethylene base product is difficultly moldable by injection.

The present invention has for its object compositions made from high density and high molecular weight polyethylene comprising from 1 to 20%, and preferably from 2 to 10% by weight of polyterpene resins, and from 99 to 80%, and preferably from 98 to 90% by weight of polyethylene.

The use of these compositions avoids the opacification of films, filaments and manufactured objects, and in addition increases the resistance to shock and delays their rupture.

For the manufacture of films, in particular, the incorporation of polyterpene resins with the high density high molecular weight polyethylene facilitates cold drawing without altering the increased resistance conferred by cold drawing. In addition, the effect of the added polyterpene resins is to permit biaxial drawing at temperatures of the order of 40 to 80° C., giving films possessing appreciably better mechanical properties than those of an unoriented film.

The present invention is of particular importance in the manufacture of filaments. The incorporation of polyterpene resins with the high density and high molecular weight polyethylene permits a lowering of the temperature of drawing of the filaments while increasing the shock and tear resistance of the latter. The use of compositions prepared in accordance with the invention is likewise quite advantageous in the manufacture of fashioned objects, and in particular flasks.

It has also been discovered that the compositions comprising high density and high molecular weight polyethylene and polyterpenes possess properties of flexibility similar to those of isotactic polypropylene, that is to say, they present, following a mild uniaxial drawing, an unexpected resistance to repeated bendings. This property permits single piece injection molding of objects such as boxes with covers and valises, in which the joint between the bottom and the cover is composed of one or several strips of the same material serving as hinges. Immediately after removal from the mold, these hinges are bent beyond their elastic limit and undergo in this manner a mild uniaxial drawing. The strips thus stretched can undergo in excess of 10,000 bendings without deterioration.

The polyethylene which is used in the process of the present invention is a polyethylene base having a linear structure as well as a high molecular weight. It is characterized by having a density between 0.94 and 0.97 and a melt index below 50 and preferably between 0.2 and 10.

Among the polyterpene resins that can be employed are the polymerization products of beta pinene corresponding to the following formula:

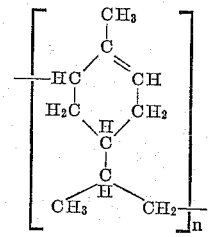

A particularly suitable product for use in the practice of the present invention is the product sold in commerce under the name "Piccolyte." "Piccolyte" resins are composed essentially of polymers of pinenes, predominantly beta pinene. These resins have a specific weight of 0.95 to 1.0 and are soluble in the usual organic solvents. The polyterpene resins suitable for use in the present invention are characterized by having fusion points ranging from 10 to 135° C. The resins having fusion points equal to or lower than 55° C. are particularly well suited for use in the present invention.

The new compositions of the present invention can be prepared according to methods well known in the art. A suitable method, for example, comprises introducing the polyethylene and the polyterpene resins into an internal type mixer, such as the "Banbury" mixer, maintained at a temperature of 150° C., and mixing for from 5 to 10 minutes. The mixture thus obtained can then be transferred into slubber extruding sticks, which are cut into granules after cooling.

The polyterpene resin can also be melted by heating in a water bath at 100° C. Or, the polyethylene can be introduced in powder form together with the stabilizers into a mixer of the fluidization type, such as that known as the "Henschel" mixer, and the resin then slowly poured upon the polyethylene by a tubular arrangement in the cover of the mixer. After stirring for ten minutes, there is obtained a nonsticky powder which can be used to feed a slubber, where the product is mixed in molten form at 200° C. and extruded in the form of sticks which are cooled and then cut into granules.

The examples given below will serve to illustrate the invention but it is understood that the invention is not limited to the specific procedures shown, as various modifications thereof will readily occur to one skilled in the art and such modifications which do not depart from the concept of the invention are intended to be included in the appended claims.

Examples 1 to 6

A polyethylene having a density of 0.95 and a melt index of 0.25, hereafter referred to as polyethylene A, was mixed in molten form at 200° C. by means of a slubber, with the different ingredients shown in Table I below. The extrudate from the slubber was cut into cylindrical granules of about 3 mm. diameter and 3 mm. length.

purpose, and plates 120 x 250 mm. of different thicknesses were removed from the mold. From these plates have been prepared the test pieces for the determination of the following different mechanical properties:

Test of traction according to the method described in ASTM D638,
Test of shock in traction according to the method described by C. G. Bragaw, Modern Plastics, June 1956, p. 199,
Measure of temperature of fragility according to the method described in ASTM D746.

The results of these tests are given in Table I below and show that the incorporation of polyterpene resins increases the resistance to shock and elongation at rupture of the polyethylene with which they are incorporated. They lower the yield stress, which signifies that the resistance to be overcome in order to effect cold drawing is diminished. Moreover, the cold drawn test pieces containing polyterpenes were transparent, which is not the case with the reference test pieces, or those containing other additives.

TABLE I

| Example No | 1 | 2 | 3 | 4 | 5 | 6 |
|---|---|---|---|---|---|---|
| Polyethylene A | | | | 1,000 | | |
| Ionol (2,6-di-tert-butyl-4-methylphenol) | | | | 0.2 | | |
| Paraffin wax [1] | | 100 | | | | |
| Polyethylene wax [2] | | | 100 | | | |
| Polyterpene resin A [3] | | | | 100 | | |
| Polyterpene resin B [4] | | | | | 100 | |
| Polyterpene resin C [5] | | | | | | 100 |
| Viscosity at 250° C., 100$^{-1}$ sec. poises | 9,500 | 7,200 | 8,000 | 7,000 | 7,000 | 8,000 |
| Melt index (190° C., 2.16 kgr.) | 0.25 | 0.36 | 0.28 | 0.43 | | |
| Tests of Traction (50 mm./min.): | | | | | | |
| Yield stress kgr./cm.$^2$ | 277 | 272 | 247 | 211 | 220 | 250 |
| Breaking stress kgr./cm.$^2$ | 133 | 116 | 112 | 103 | 110 | 110 |
| Elongation at rupture kgr./cm.$^2$ | 50 | 53 | 53 | 93 | 85 | 60 |
| Appearance of drawn part | Opaque | Opalescent | Opaque | | Transparent | |
| Resistance to impact in traction, kgr. cm./cm.$^3$ | 140 | 80 | 100 | 150 | 140 | 100 |
| Temperature of fragility, °C | −119 | −100 | −104 | −91 | −85 | −80 |

[1] Paraffin wax having a softening point (ball and ring method) of 72–74° C.
[2] Polyethylene wax AC-6 A (Allied Chemical Co.)
[3] Polyterpene resin A softening point (ball and ring method) 10° C.
[4] Polyterpene resin B: softening point (ball and ring method) 55° C.
[5] Polyterpene resin C: softening point (ball and ring method) 115° C.

By means of an extrusion viscosimeter, similar to that described by E. B. Bagley in Journal of Applied Physics, May 1957, page 624, the viscosity of these mixtures was measured at 250° C. and under a speed gradient of 100$^{-1}$ sec. The melt index was measured in accordance with the method described in ASTM D1238. The mixture in the form of granules was then molded by compression at between 50 and 100 kgr./cm.$^2$, for 20 minutes, in a positive mold heated to a temperature between 160 and 180° C. At the end of this time, the mold was cooled by circulation of cold water through a pipe provided for this

Examples 7 to 12

A polyethylene having a density of 0.96 and a melt index of 5.5, hereafter referred to as polyethylene B, was mixed with different ingredients and treated according to the same technique described in Examples 1 to 6.

The compositions were examined and the results obtained are given in Table II below. The results show, just as in the case of Examples 1 to 6, that the incorporation of polyterpene resins improved the resistance to impact and elongation at rupture and rendered the cold drawn test pieces transparent.

TABLE II

| Example No | 7 | 8 | 9 | 10 | 11 | 12 |
|---|---|---|---|---|---|---|
| Polyethylene B | | | | 1,000 | | |
| Ionol (2,6-di-tert-butyl-4-methyphenol) | | | | 0.2 | | |
| Paraffin wax [1] | | 100 | | | | |
| Polyethylene wax [2] | | | 100 | | | |
| Polyterpene resin A [3] | | | | 100 | | |
| Polyterpene resin B [4] | | | | | 100 | |
| Polyterpene resin C [5] | | | | | | 100 |
| Viscosity at 250° C., 100$^{-1}$ sec. poises | 2,300 | 1,500 | 1,600 | 1,700 | 1,700 | 1,700 |
| Melt index (190° C., 216 kgr.) | 5.5 | 8.4 | 7.9 | 7.9 | 6.6 | 6.8 |
| Tests of Traction: | | | | | | |
| Yield stress kgr./cm.$^2$ | 296 | ([6]) | ([6]) | 236 | 238 | 271 |
| Breaking stress kgr./cm.$^2$ | 160 | 288 | 281 | 150 | 110 | |
| Elongation at rupture 2% | 24 | 18 | 20 | 48 | 58 | 29 |
| Appearance of drawn part | Opaque | Opalescent | Opaque | | Transparent | |
| Resistance to impact in traction, kgr. cm./cm.$^3$ | 60 | 31 | 51 | 80 | 76 | 45 |
| Temperature of fragility, °C | −82 | +32 | +42 | +5 | +7 | +20 |

[1][2][3][4][5] See Table I.
[6] Rupture produced at "point of elastic limit."

Examples 13 to 17

The polyethylene of Examples 1 to 6 to which was added different amounts of the polyterpene resin, A, shown in Table III below, was mixed in melted form at 200° C. by means of a slubber. The extrudant from the slubber was cut into cylindrical granules of 3 mm. diameter and 3 mm. length. These granules were introduced into an injection press equipped with a mold conforming to ASTM D643 and permitting the production of test pieces in the shape of dumbbells for use in the traction tests of ASTM D638. These traction tests were carried out at a speed of 50 mm./min. and at 23° C. The results comprise the yield stress and the tension of plastic drawing. The beneficial effect of the incorporation of the polyterpene resins upon the transparency of the cold drawn test pieces and upon the endurance to bending, as well as upon the ease of cold drawing (measured by the difference $Y-Z$), was very notable when using 20 gr. amounts of polyterpene resins per kgr. of polyethylene, or about 2% by weight.

The examples in Table IV show that, for a given material, an increase of the temperature facilitates the drawing. Likewise, the incorporation of the polyterpene resin A with the polyethylene diminishes the "yield stress"—"tension of plastic drawing."

The test pieces which have undergone a drawing in the plastic form show a portion which has undergone a contraction, and of which the section is weaker than the initial section of the test piece. This portion is transparent, for the polyethylene to which has been added polyterpene resin, regardless of the temperature at which the drawing was effected. For the polyethylene which does not contain polyterpene resin, this portion was transparent only when the drawing was effected at a temperature equal to or higher than 100° C.

For each of the drawn test pieces, the narrowed portion was fixed between the chucks of the traction machine and the force required to effect rupture measured. In every case, the breaking stress of the narrowed portion was

TABLE III

| Example No. | 13 | 14 | 15 | 16 | 17 |
|---|---|---|---|---|---|
| Polyethylene A | | | 1,000 | | |
| Ionol (2,6-di-tert-butyl-4-methylphenol) | | | 0.2 | | |
| Polyterpene resin A | 0 | 20 | 50 | 100 | 200 |
| Yield stress (Y) kgr./cm.$^2$ | 230 | 210 | 190 | 170 | 150 |
| "Plastic tension of drawing" (Z) krg./cm.$^2$ | 130 | 120 | 102 | 110 | 110 |
| Y−Z, kgr./cm.$^2$ | 100 | 90 | 70 | 60 | 40 |
| Appearance of drawn portion | Opaque | | | Transparent | |

Examples 13 to 19

A polyethylene of 0.95 density and melt index of 0.7, hereafter referred to as polyethylene C, was mixed in melted form at 200° C. with the ingredients shown in Table IV by means of a slubber. The mixes were then treated in the manner described for Examples 13 to 17. The traction tests were carried out at a speed of 50 mm./min. and at different temperatures.

When the test pieces were drawn at a constant speed, the force applied to the chuck of the drawing machine increased to a maximum value: the ratio of this maximum force to the initial section of the test piece is called "yield stress," and represents the resistance to the drawing of the material in the plastic form. After having passed a maximum, the force diminishes and then remains fairly constant to the point of rupture. This force at rupture, divided by the initial section of the test piece, is called the "tension of plastic drawing." If the difference between the yield stress and the tension of plastic drawing is large, cold drawing is difficult and may be prevented by premature rupture. All modifications of the operating conditions or of the behavior of the material which reduce the difference between the yield stress and the tension of plastic drawing, will have the effect of facilitating the drawing and of diminishing the risk of premature rupture.

greater than the breaking stress of a test piece which had not been drawn. Cold drawing then caused a stiffening of the material. The results given in Table IV show that the breaking stress of the strengthened test pieces depends upon the temperature at which the drawing was effected, but it was approximately the same as the polyethylene which either contains or does not contain polyterpene resin.

These examples show then that the incorporation of polyterpene resins with polyethylene facilitates its cold drawing, without altering the added resistance conferred by cold drawing.

TABLE IV

| Example No. | 18 | | | | 19 | | | |
|---|---|---|---|---|---|---|---|---|
| Composition, gr.: | | | | | | | | |
| Polyethylene C | | | | | 1,000 | | | |
| Ionol (2,6-di-tert-butyl-4-methylphenol) | | | | | 0.2 | | | |
| Polyterpene resin A | | | | | | | | 100 |
| Results* | Y | Z | Y−Z | X | Y | Z | Y−Z | X |
| Drawing temperature, °C.: | | | | | | | | |
| 20 | 263 | 189 | 74 | | 225 | 169 | 56 | |
| 40 | 203 | 165 | 38 | | 167 | 144 | 23 | 800 |
| 60 | 146 | 131 | 15 | 1,200 | 132 | 123 | 9 | 1,100 |
| 80 | 112 | 102 | 10 | 1,300 | 101 | 93 | 8 | 1,500 |
| 100 | 77 | 70 | 7 | 1,800 | 70 | 63 | 7 | 1,800 |

*Y—Yield stress, kgr./cm.$^2$; Z—"Tension of plastic drawing," kgr./cm.$^2$; X—Breaking stress of the reinforced portion, kgr./cm.$^2$

Examples 20 to 21

The granules obtained by the method of operation of Examples 13 to 17 from polyethylene C and polyterpene resin A were prepared, by means of a slubber provided with a circular draw plate of 0.8 mm. diameter, in the form of a thread of about 1 mm. diameter cooled by cold water. This thread was then drawn by passage over a first train of cylinders I the peripherial speed of which was 10 m./min. and then over a second train of cylinders II, the peripherial speed of which was 100 m./min. Between these two trains of cylinders, the thread passed through a water bath at different temperatures. After drawing, there was obtained a thread of about 0.3 mm. diameter, the resistance of which was measured. The results obtained are given in Table V. They show that the incorporation of polyterpene resin lowers the minimum temperature of drawing without rupture and increases the resistance of the filaments.

TABLE V

| Example No. | 20 | 21 |
|---|---|---|
| Polyethylene C | 1,000 | |
| Ionol (2,6-di-tert-butyl-4-methylphenol) | 0.2 | |
| Polyterpene resin A | ---------- | 100 |
| Minimum temperature or drawing without rupture, °C | 90 | 40 |
| Tenacity of drawn thread at this temperature, gr./denier | 5 | 6 |

Examples 22 and 23

Granules obtained according to the procedure of Examples 13 to 17 were transformed, by means of a slubber equipped with an annular draw plate, into a tube 150 mm. in diameter and of 0.2 mm. thickness, by the classic blown extrusion process.

This tube was then cut into pieces of about 1 m. length, conforming to FIGURE 1 of the annexed drawing, one end being fastened, by means of a pressure collar 1 to a tube 2 connected to a source of compressed air 3. The other end was fastened by means of a pressure collar 4 to a solid full cylinder 5 of a mobile apparatus exerting upon the tube 7 a force of axial traction, at speed of 500 mm./min. At the same time there was introduced compressed air by the tube 2 under a pressure limited to 0.3 kgr./cm.$^2$ and with a delivery limited to 0.9 m.$^3$/h. (measured at 20° C. and at atmospheric pressure). The tube 7 was surrounded by a wall 8 within which air circulated at a regulated temperature introduced by pipe 9.

The traction and the pressure simultaneously brought about a longitudinal drawing and distension of the tube, which then drew it biaxially. The rate of drawing was approximately 2:1 in two directions.

The mechanical properties of the film thus drawn were measured. The results are shown in Table VI. The drawing was effected without tearing except when the temperature of the air circulating in the surrounding box was above a certain limit. Table VI shows that for the polyethylene which did not contain an additive this limit was in the neighborhod of 100° C. The incorporation of polyterpene resin reduced this limit to approximately 50° C. The mechanical properties of the drawn film obtained were not appreciably influenced by the presence of the polyterpene resin.

TABLE VI

| Example No. | 22 | 23 |
|---|---|---|
| Composition, gr.: | | |
| Polyethylene C | 1,000 | |
| Ionol (2,6-di-tert-butyl-4-methylphenol) | 0.2 | |
| Polyterpene resin A | ---------- | 100 |
| Minimum temperature of drawing without rupture, °C | 100 | 50 |
| Breaking stress of drawn film, kgr./mm.$^2$: | | |
| Direction longitudinal | 4 | 4 |
| Direction transversal | 4 | 4 |

Examples 24 to 28

Polyethylene B, described in Examples 7 to 12, was mixed in melted form at 200° C., by means of a slubber, with the different ingredients listed in Table I. The extrudant from the latter was cut into cylindrical granules of the order of 3 mm. diameter by 3 mm. length.

The mixtures obtained were molded by injection in a manner so as to obtain test pieces of the form shown in FIGURE 2 of the attached drawings. These test pieces were submitted to repeated flexing following the procedure described in DIN 53,374, at the rate of 1000 flexes per minute, to rupture.

TABLE VII

| Example No. | 24 | 25 | 26 | 27 | 28 |
|---|---|---|---|---|---|
| Composition, gr./kgr.: | | | | | |
| Polyethylene B | | | 1,000 | | |
| Ionol (2,6-di-tert-butyl 4-methylphenol) | | | 0.2 | | |
| Polyterpene resin | 0 | 20 | 50 | 100 | 200 |
| Number of flexes before rupture | 1,200 | 4,600 | >10,000 | >10,000 | >10,000 |

It is noted that the incorporation of polyterpene resin with polyethylene appreciably increased the number of flexes that a test piece can undergo before its rupture. Such mixtures then are suitable for the manufacture of test strip pieces serving as hinges and, what is particularly interesting, for the single piece molding of objects such as boxes with covers and valises, in which the joint between the bottom and the cover is composed of one or several strips of the same material serving as hinges.

What is claimed is:

1. Plastic compositions comprising 1 to 20% by weight of a polymerization product of a terpene mixture consisting essentially of pinenes, beta pinene being the predominant constituent of said pinenes, said polymerization product having a fusion point no higher than 55° C., and 99 to 80% by weight of a polyethylene resin having a density of not substantially less than 0.94 and a melt index of less than 50.

2. Plastic compositions comprising 2 to 10% by weight of a polymerization product of a terpene mixture consisting essentially of pinenes, beta pinene being the predominant constituent of said pinenes, said polymerization product having a fusion point no higher than 55° C., and 98 to 90% by weight of a polyethylene resin having a density of not substantially less than 0.94 and a melt index of less than 50.

3. A method of producing plastic compositions which comprises mixing at temperature of not substantially lower than 100° C. 1 to 20 parts by weight of a polymerization product of a terpene mixture consisting essentially of pinenes, beta pinene being the predominant constituent of said pinenes, said polymerization product having a fusion point no higher than 55° C., with from 99 to 80% by weight of a polyethylene resin having a density of not substantially less than 0.94 and a melt index of less than 50.

4. A method of producing plastic compositions which comprises mixing at a temperature of not substantially lower than 100° C. 2 to 10° by weight of a polymerization product of a terpene mixture consisting essentially of pinenes, beta pinene being the predominant constitutent of said pinenes, said polymerization product having a fusion point no higher than 55° C., with 98 to 90% by weight of a polyethylene resin having a density of not substantially less than 0.94 and a melt index of less than 50.

5. A method for the production of plastic compositions suitable for the production of transparent, highly flexible plastic objects having a polyethylene base which comprises mixing at temperatures not substantially lower than 100° C. from 1 to 20% by weight of a polymerization product of a terpene mixture consisting essentially of pinenes, beta pinene being the predominant constituent of said pinenes, said polymerization product having a fusion point no higher than 55° C. with 99 to 80° by weight of polyethylene having a density of not substantially less than 0.94 and a melt index of less than 50.

6. A process for the production of transparent biaxially drawn films, filaments and fashioned articles which comprises drawing at temperatures between 40° and 80° C. films composed of 1–20% of a polymerization product of a terpene mixture consisting essentially of pinenes, beta pinene being the predominant constitutent of said pinenes, said polymerization product having a fusion point no higher than 55° C. and 99–80% of polyethylene resin having a density of not less than 0.94 and a melt index of less than 50.

References Cited

UNITED STATES PATENTS 3,278,646  10/1966  Lambert _____ 260—897

G. F. LESMES, *Primary Examiner.*

MURRAY TILLMAN, *Examiner.*

T. G. FIELD, *Assistant Examiner.*